United States Patent
Keller et al.

(10) Patent No.: US 6,753,504 B2
(45) Date of Patent: Jun. 22, 2004

(54) METHOD FOR WELDING TOGETHER TWO PARTS WHICH ARE EXPOSED TO DIFFERENT TEMPERATURES, AND TURBOMACHINE PRODUCED USING A METHOD OF THIS TYPE

(75) Inventors: Sorin Keller, Oberrohrdorf (CH); Richard Brendon Scarlin, Oberflachs (CH); Markus Staubli, Dottikon (CH); Rodney Williams Vanstone, Rugby (GB)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/094,707

(22) Filed: Mar. 12, 2002

(65) Prior Publication Data

US 2002/0172587 A1 Nov. 21, 2002

(30) Foreign Application Priority Data

Mar. 14, 2001 (DE) .......................................... 101 12 062

(51) Int. Cl.$^7$ .............................................. B23K 9/00
(52) U.S. Cl. ........................... 219/137 WM; 219/137 R
(58) Field of Search ................................ 219/137 WM, 219/137 R, 136, 121.11

(56) References Cited

U.S. PATENT DOCUMENTS

| | | | | | |
|---|---|---|---|---|---|
| 2,447,896 A | * | 8/1948 | Clarke | .......................... | 253/77 |
| 3,088,192 A | * | 5/1963 | Turner | ........................ | 29/156.8 |
| 4,086,690 A | | 5/1978 | Bernasconi | | |
| 4,497,670 A | * | 2/1985 | Siga et al. | ................ | 148/12 R |
| 4,962,586 A | * | 10/1990 | Clark et al. | ................. | 29/889.2 |
| 5,024,582 A | * | 6/1991 | Bellows et al. | ......... | 416/213 R |
| 5,431,752 A | * | 7/1995 | Brogle et al. | ............... | 148/516 |
| 5,710,405 A | | 1/1998 | Solomon et al. | | |

FOREIGN PATENT DOCUMENTS

| | | |
|---|---|---|
| DE | 937327 | 1/1956 |
| DE | 2901338 | 7/1980 |
| DE | 3009476 | 9/1980 |
| DE | 4115230 C2 | 1/1992 |
| DE | 4126443 C2 | 2/1992 |
| DE | 19741637 A1 | 3/1999 |
| EP | 0207259 B2 | 1/1987 |

OTHER PUBLICATIONS

A.M. Barnes, Solidification Cracking Susceptibility of Modified 9Cr1Mo SubmergedArc Weld Metals: The Influence of Mn and Nb, Parsons 2000 Advanced Materials for $21^{st}$ Centurty Turbines and Power Plant, Proceedings of the Fifth International Charles Parsons Turbine Conference, Cambridge, UK pp. 407–430.

*Metals Handbook, Desk Edition, Second Edition*, J.R. Davis, ISBN 0–87170–654–7, p. 610, Table 1 (1998).

\* cited by examiner

*Primary Examiner*—M. Alexandra Elve
(74) *Attorney, Agent, or Firm*—Burns, Doane, Swecker & Mathis, L.L.P.

(57) ABSTRACT

In a method for welding together two parts (12, 13), especially of a turbomachine, which are exposed to different temperatures, of which the first part (12) consists of a steel and the second part (13) consists of a nickel-base alloy which contains elements which are unfavorable for welding to steel, such as for example Nb, a crack-free welded joint is achieved by the fact that first of all an intermediate layer (18), in which the amount of unfavorable elements is progressively reduced from the inside outward, is applied to the joining surface (17) which is provided for the welding, and that then the second part (13), which has been provided with the intermediate layer (18), is welded to the first part (12).

25 Claims, 2 Drawing Sheets

METHOD FOR WELDING TOGETHER TWO PARTS WHICH ARE EXPOSED TO DIFFERENT TEMPERATURES, AND TURBOMACHINE PRODUCED USING A METHOD OF THIS TYPE

FIELD OF THE INVENTION

The present invention relates to the field of joining technology. It relates to a method for welding together two parts which are exposed to different temperatures in accordance with the preamble of claim 1.

BACKGROUND OF THE INVENTION

The efficiency of a thermal machine, for example in a steam power plant, can be improved considerably by increasing the working temperature, for example to over 650° C. The rotors of the high-temperature steam turbines used in a power plant of this type, for working temperatures of over 650° C., should be produced from creep-resistant nickel-base alloys. However, nickel-base alloys (superalloys) of this type, such as for example Inconel, are considerably more expensive (for example ten times more expensive) than standard steels.

On the other hand, in thermal machines there are sections which are exposed to very high temperatures and sections which are exposed to less high temperatures. To minimize the costs of a turbine rotor or similar machine parts, it would therefore be possible and desirable to produce the high-temperature part from a nickel-base alloy and the remainder (e.g. the end pieces of the rotor) from steel. Producing a rotor of this type from individual rotor discs, as is described, for example, in U.S. Pat. No. 4,086,690 then requires the parts made from steel and the parts made from nickel-base alloy to be joined. A join of this type can be produced either by screw connections or by welding. Since in large machines screw connections are exposed to extremely high loads and there is scarcely any experience of such connections in machines of this type, in actual fact the only suitable joining process is welding.

Suitable nickel-base alloys for applications of this type may be alloyed with Nb in order to acquire the required resistance to creep. An Nb-containing nickel-base alloy of this type is known, for example, under the name Inconel 625 or IN625. Parts which consist of alloys of this type can easily be joined together by welding.

On the other hand, welded joints between parts which consist of steel and parts which consist of a nickel-base alloy which contains, for example, Nb or other additional elements cause problems. The local melting of the nickel-base alloy during welding in this case leads to an increase in the levels of Nb or the other additional element in the weld seam, leading to the formation of cracks in the welded joint. Attempts to reduce the extent to which the nickel-base alloy is melted, by reducing the introduction of heat by using relatively thin welding electrodes or the like, have hitherto enjoyed only limited success.

It is known from U.S. Pat. No. 4,962,586 to form a turbine rotor by welding together two rotor parts which are exposed to different temperatures and consist of two different low-alloy steels. To improve the welded joint, first of all surfacing welding is used to apply a layer of filler material to the joining surface of the rotor part which is intended for high temperatures, and this layer is then machined. The filler material leads to better matching between the different steel grades in the welded joint. Then, the two parts are welded together. This known process differs in that it relates to the operation of joining two parts made from steel. The cladding (FIG. 3, 4) is carried out so that the clad part (clad layer 51) can be more highly annealed than is tolerable for the other part. The procedure is thermally managed and comprises the steps of cladding, high annealing, welding and low annealing.

SUMMARY OF THE INVENTION

It is an object of the invention to provide a method for welding together parts made from steel and from a nickel-base alloy which contains additional elements, such as for example Nb, which, while being simple to employ and involving little outlay, leads to a stable welded joint, and to provide a turbomachine which is produced using this method.

The object is achieved by the combination of features given in claims 1 and 9. The essence of the invention consists in, first of all, applying an intermediate layer, in which the amount of the additional elements, such as for example Nb, is progressively reduced from the inside outward, to the joining surface, which is provided for welding, of the part which consists of the superalloy which contains, for example, Nb, and then welding the part which has been provided with the intermediate layer to the part which consists of steel. The intermediate layer reduces the harmful increase in the levels of Nb or other elements which are unfavorable to welding in the weld seam to such an extent that a stable, crack-free welded joint is formed.

According to a first preferred configuration of the method according to the invention, the intermediate layer is composed of a nickel-base alloy which is free of the additional elements. This results in a high-quality welded joint.

The production of the intermediate layer is made particularly simple if the intermediate layer, according to another configuration of the invention, is composed of a plurality of single layers which are applied in succession and lie on top of one another. In this case, it has been found that, for the intermediate layer, five single layers of IN617 on an IN625 part which is to be welded are sufficient to reliably prevent cracking of the welded joint if further layers from steel electrodes are used for the welding.

The number of the single layers in the intermediate layer can be reduced by carrying out the welding using the MAG (metal active gas) process or the TIG (tungsten inert gas) process. Application by means of strip electrodes, wire electrodes, using the electroslag strip process or by casting on is also conceivable.

It is preferable for the second part to consist of Inconel 625 (IN625) and for the intermediate layer or the single layers to be formed from Inconel 617 (IN617).

A preferred configuration of the turbomachine according to the invention is characterized in that the end pieces and the adjacent rotor discs or drums are joined to one another with a material-to-material bond by a weld seam, and in that an intermediate layer of a nickel-base alloy, preferably Inconel 617 (IN617), in which the amount of the additional elements is progressively reduced toward the weld seam (19), is arranged between the weld seam and the respective rotor disc or drum.

Further embodiments will emerge from the dependent claims.

BRIEF DESCRIPTION OF THE DRAWINGS

The invention is to be explained in more detail below with reference to exemplary embodiments and in conjunction with the drawing, in which.

DETAILED DESCRIPTION OF THE INVENTION

Figure 1:
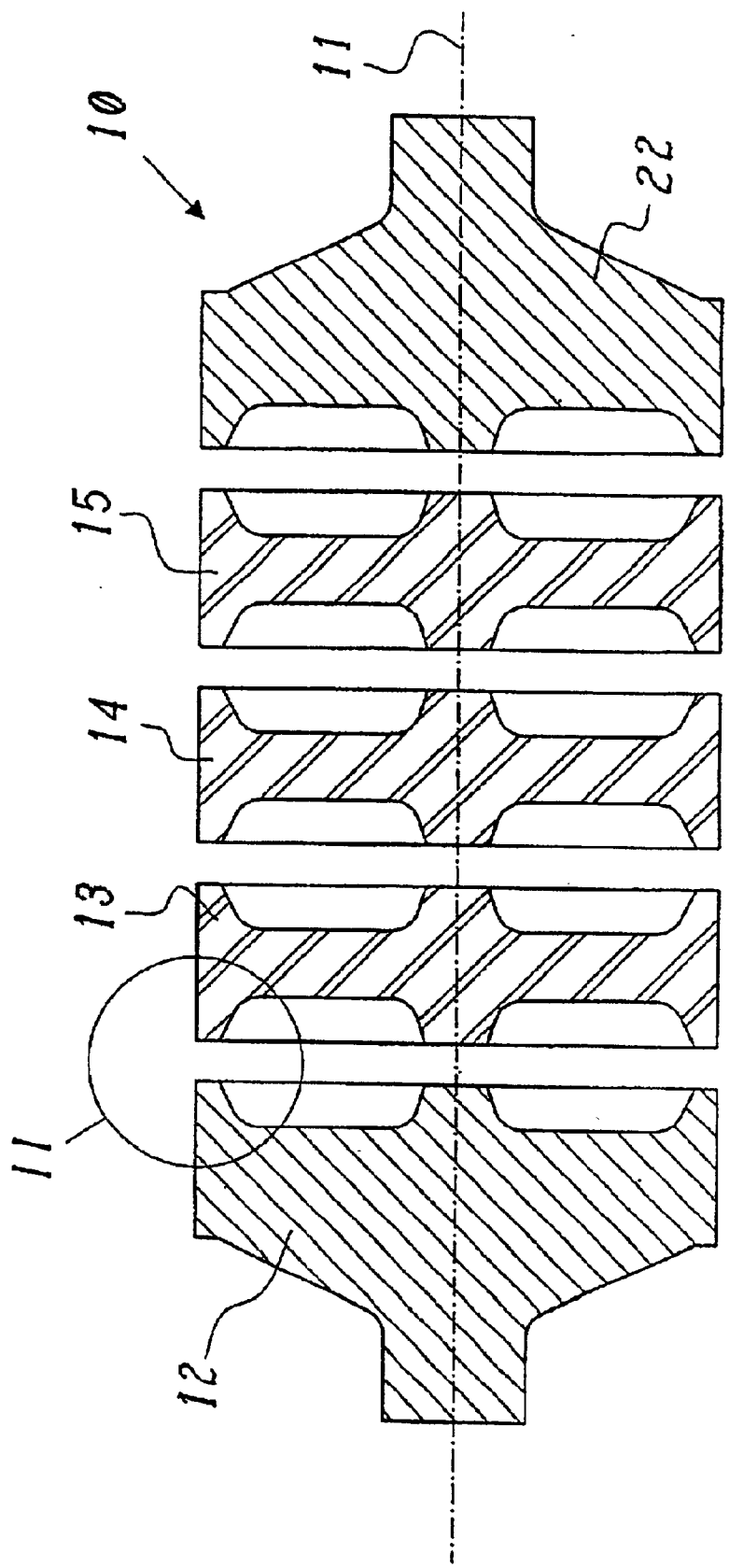
FIG. 1 diagrammatically depicts a longitudinal section through rotor discs made from an Nb-containing nickel-base alloy and end pieces made from steel, which are welded together to form a rotor of a turbomachine using the method according to the invention.

FIG. 1 diagrammatically depicts a longitudinal section through rotor discs or drums 13, . . . ,15 made from an Nb-containing nickel-base alloy and end pieces 12, 22 made from steel, which are to be welded together to form a rotor 10, which can rotate about a rotor axis 11, of a turbomachine using the method according to the invention. The rotor discs 13, . . . ,15 belong to the high-temperature part of the rotor 10 and, in the finished rotor, bear, for example, blades and vanes. The end pieces 12, 22 are used to support the rotor 10 and are exposed to lower thermal loads. The rotor discs 13, . . . ,15 can be welded to one another in a conventional way, as the rotor discs consist of the same material.

Figure 2:
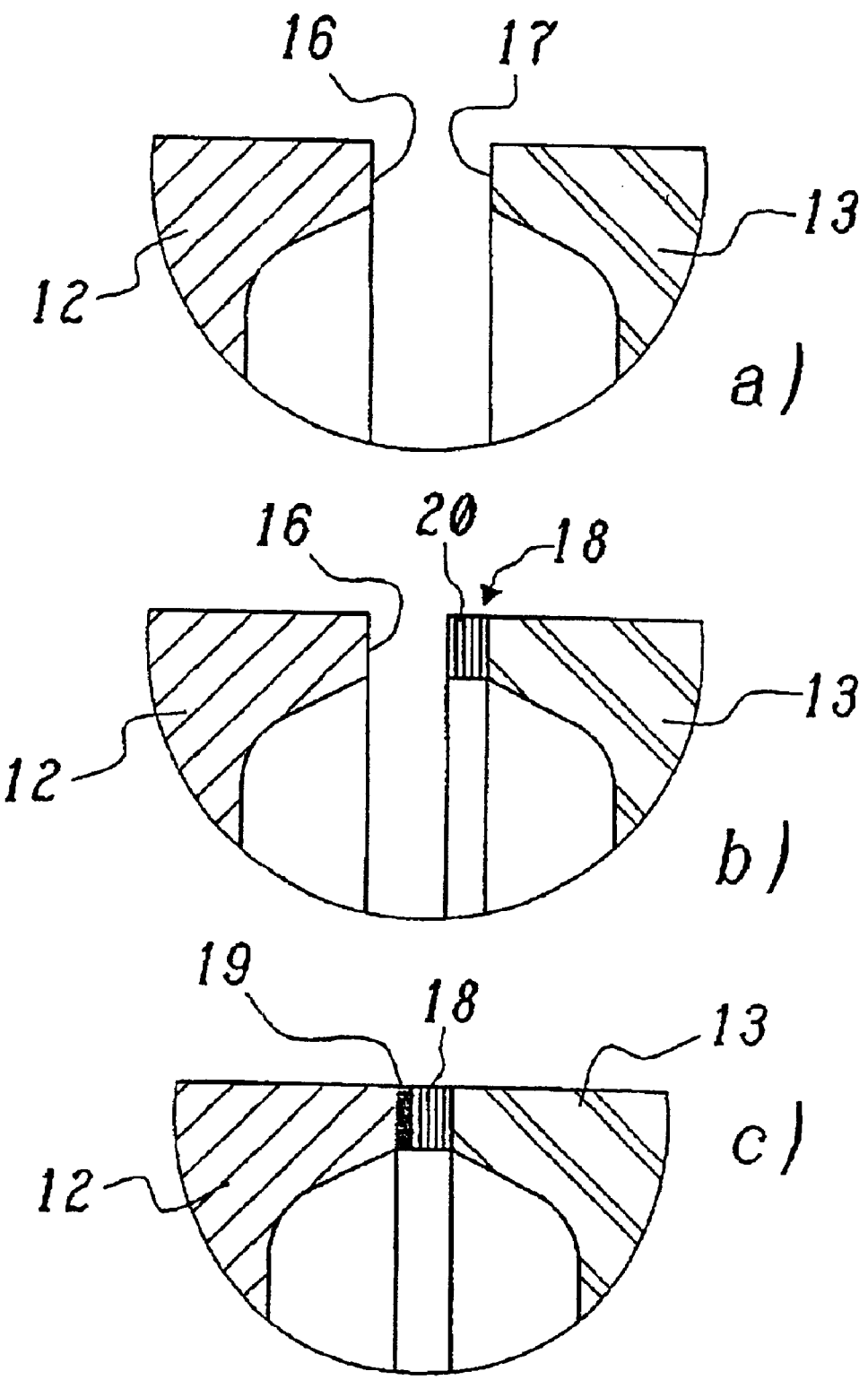
FIGS. 2a–c show, as an enlarged excerpt from FIG. 1, various steps involved in the method according to a preferred exemplary embodiment of the invention.

By contrast, the welded joint between the end pieces 12 or 22, which consist of steel, and the adjacent rotor discs 13 or 15, which consist of the superalloy, presents more difficulties. The process according to the invention which is used in this case is illustrated in various steps in the partial FIGS. (a) to (c) of FIG. 2 with reference to the example of welding together the end piece 12 and the rotor disc 13 (in the enlarged excerpt II from FIG. 1). The parts 12 and 13 which are to be joined in each case have a ring-like joining surface 16 or 17, respectively (FIG. 2a).

Before the parts 12 and 13 are welded together, first of all an intermediate layer 18, which is preferably composed of a plurality of (e.g. 5) thin single layers 20 lying on top of one another, is applied to the joining surface 17 of the rotor disc 13 (FIG. 2b; the thickness of the single layers 20 is exaggerated for the sake of clarity). The intermediate layer 18 is used to prevent a build-up of, for example, Nb or other elements which are unfavorable for welding to steel from the superalloy of the rotor disc 13 in the subsequent weld seam 19 (FIG. 2c) or to reduce this phenomenon to such an extent that cracking of the welded joint caused by the increase in the levels of Nb is reliably avoided. This is achieved by the fact that, in the single layers 20 which are successively applied, the proportion of these elements decreases progressively. After the intermediate layer 18 has been applied (welded on), the two parts 12 and 13 can be welded together to form the weld seam 19 (FIG. 2c).

In practice, it has emerged that the use of five single layers 20 made from the Nb-free alloy IN617 on a part 13 consisting of the Nb-containing alloy IN625 is sufficient to prevent the welded joint from cracking when further layers are produced by means of a steel electrode. However, the number of the single layers 20 can also be reduced if welding methods which melt as little as possible of the part consisting of the superalloy are used. These include welding methods in which only low levels of heat are introduced and small electrode diameters are used, such as for example the MAG (metal active gas) method, the TIG (tungsten inert gas) method or the submerged-arc with strip electrodes.

The method according to the invention therefore makes it possible to use large rotor discs made from IN625 of high strength with a relatively small addition of IN617 of lower strength (for the intermediate layers), in order to produce a stable, crack-free welded rotor comprising steel discs or shaft ends and discs made from a nickel-base superalloy.

| LIST OF REFERENCE SYMBOLS | |
|---|---|
| 10 | Rotor |
| 11 | Rotor axis |
| 12, 22 | End piece |
| 13, . . . , 15 | Rotor disc or drum |
| 16, 17 | Joining surface (ring-like) |
| 18 | Intermediate layer |
| 19 | Weld seam |
| 20 | Single layer |

What is claimed is:

1. Method for welding together two parts, especially of a turbomachine, which are exposed to different temperatures, of which the a first part is made from a steel and the a second part is made from a nickel-base alloy, which nickel-base alloy contains additional elements which, when joined to steel, cause the formation of cracks or unfavorable mechanical properties in the a joining zone, wherein first of all an intermediate layer, in which the an amount of the additional elements is progressively reduced from inside outward, is applied to a joining surface, which is provided for the welding of the second part, and wherein then the a second part, which has been provided with the intermediate layer, is welded to the first part.

2. The method as claimed in claim 1, wherein the intermediate layer is composed of a nickel-base alloy which is free of the additional elements which cause formation of cracks or unfavorable mechanical properties in the joining zone when joined to steel.

3. The method as claimed in claim 1, wherein the intermediate layer is composed of a plurality of single layers which are applied in succession and lie on top of one another.

4. The method as claimed in claim 1, wherein steel-based welding filler materials are used to weld the two parts together.

5. The method as claimed in claim 1, wherein the welding is carried out using the MAG process, the TIG process or using a submerged-arc wire process.

6. The method as claimed in claim 1, wherein the intermediate layer is applied by being welded on, and in that the welding-on operation takes place using the MAG process, the TIG process, the submerged-arc wire process, the submerged-arc strip process or the electroslag strip process.

7. The method as claimed in claim 1, wherein the intermediate layer is applied by being cast on.

8. The method as claimed in claim 1, wherein the second part consists of, in weight %,

| | |
|---|---|
| Cr | 20–23 |
| Fe | 5 |
| Co | 1 |
| Mo | 8–10 |
| Nb | 3.15–4.15 |
| Ti | 0.4 |
| Al | 0.4 |
| C | .1 |
| Mn | 0.5 |
| Si | 0.5 |
| Ni | at least 58, | and wherein the intermediate layer or the single layers is or are formed from in weight %,

| | |
|---|---|
| Cr | 20–24 |
| Fe | 3 |
| Co | 10–15 |
| Mo | 8–10 |
| Ti | 0.6 |
| Al | 0.8–1.5 |
| C | 0.05–0.15 |
| Mn | 1 |
| Si | 1 |
| B | 0.006 |
| Cu | 0.5 |
| Ni | at least 44.5. |

9. The method as claimed in claim 1, wherein the first part is an end piece and the second part is a rotor disc or drum of a rotor of a turbomachine.

10. A turbomachine having a thermally loaded rotor which is welded together from individual rotor discs or drums and end pieces, wherein the highly thermally loaded rotor discs or drums consist of a nickel-base alloy which contains additional elements which are unfavorable for joining to steel, wherein the end pieces, which are subject to lower thermal loads, consist of a steel, and wherein the end pieces and the adjacent rotor discs or drums are welded together using the method as claimed in claim 1.

11. The turbomachine as claimed in claim 10, wherein the end pieces and the adjacent rotor discs or drums are joined to one another with a material-to-material bond by a weld seam, and wherein an intermediate layer of a nickel-base alloy; in which the amount of the additional elements is progressively reduced toward the weld seam, is arranged between the weld seam and the respective rotor disc or drum.

12. A method for welding together two parts which are exposed to different temperatures, a first part formed from a steel and a second part formed from a nickel-based alloy including at least one first additional element, the method comprising:

applying an intermediate layer to a joining surface of the second part, the intermediate layer comprising a nickel-based alloy; and welding the second part to the first part, wherein the first additional element, when joined to steel, causes the formation of cracks or unfavorable mechanical properties in a joining zone between the first part and the second part.

13. The method as claimed in claim 12, wherein the first additional element is Nb.

14. The method as claimed in claim 12, wherein the intermediate layer is free of the first additional element.

15. The method as claimed in claim 12, wherein the intermediate layer comprises a second additional element corresponding to the first additional element of the second part, the second additional element present in a concentration gradient where a concentration of the second additional element is progressively reduced from the joining surface outward towards a surface abutting the first part, and wherein the second additional element, when joined to steel, causes the formation of cracks or unfavorable mechanical properties in a joining zone between the first part and the second part.

16. The method as claimed in claim 15, wherein the second additional element is Nb.

17. The method as claimed in claim 12, wherein the two parts are of a turbomachine.

18. The method as claimed in claim 12, wherein the second part consists of, weight %,

| | |
|---|---|
| Cr | 20–23 |
| Fe | 5 |
| Co | 1 |
| Mo | 8–10 |
| Nb | 3.15–4.15 |
| Ti | 0.4 |
| Al | 0.4 |
| C | .1 |
| Mn | 0.5 |
| Si | 0.5 |
| Ni | at least 58 | and the nickel-base ahoy of the intermediate layer is, in weight %,

| | |
|---|---|
| Cr | 20–24 |
| Fe | 3 |
| Co | 10–15 |
| Mo | 8–10 |
| Ti | 0.6 |
| Al | 0.8–1.5 |
| C | 0.05–0.15 |
| Mn | 1 |
| Si | 1 |
| B | 0.006 |
| Cu | 0.5 |
| Ni | at least 44.5. |

19. A turbomachine having a thermally loaded rotor which is welded together from individual rotor discs or drums and end pieces, wherein the end pieces consist of a steel, wherein the rotor discs or drums comprise a nickel-based alloy and at least one additional element unfavorable for joining to steel, and wherein the end pieces and the adjacent rotor discs are welded together at a weld seam to form a material-to-material bond using the method as claimed in claim 12.

20. The turboinachine as claimed in claim 19, wherein the at least one additional element unfavorable for joining to steel an alloy including, in weight %,

| | |
|---|---|
| Cr | 20–23 |
| Fe | 5 |
| Co | 1 |
| Mo | 8–10 |
| Nb | 3.15–4.15 |
| Ti | 0.4 |
| Al | 0.4 |
| C | .1 |
| Mn | 0.5 |
| Si | 0.5 |
| Ni | at least 58. |

21. The turbomachine as claimed in claim 19, wherein an intermediate layer of a nickel-based alloy is arranged between the weld seam and the respective rotor disc or drum, the intermediate layer having an amount of the additional element progressively reduced from the rotor disc or drum toward the weld seam.

22. The turbomachine as claimed in claim 21, wherein the intermediate layer an alloy including

| | |
|---|---|
| Cr | 20–24 |
| Fe | 3 |
| Co | 10–15 |
| Mo | 8–10 |
| Ti | 0.6 |
| Al | 0.8–1.5 |
| C | 0.05–0.15 |
| Mn | 1 |
| Si | 1 |
| B | 0.006 |
| Cu | 0.5 |
| Ni | at least 44.5. |

23. The method as claimed in claim 1, wherein the additional elements include Nb.

24. The turbomachine as claimed in claim 10, wherein the nickel-base alloy has a composition, in weight %, of

| | |
|---|---|
| Cr | 20–23 |
| Fe | 5 |
| Co | 1 |
| Mo | 8–10 |
| Nb | 3.15–4.15 |
| Ti | 0.4 |
| Al | 0.4 |
| C | .1 |
| Mn | 0.5 |
| Si | 0.5 |
| Ni | at least 58. |

25. The turbomachine as claimed in claim 11, wherein the nickel-base alloy of the intermediate layer has a composition, in weight %, of

| | |
|---|---|
| Cr | 20–24 |
| Fe | 3 |
| Co | 10–15 |
| Mo | 8–10 |
| Ti | 0.6 |
| Al | 0.8–1.5 |
| C | 0.05–0.15 |
| Mn | 1 |
| Si | 1 |
| B | 0.006 |
| Cu | 0.5 |
| Ni | at least 44.5. |

* * * * *